(12) United States Patent
Chen et al.

(10) Patent No.: US 12,347,165 B2
(45) Date of Patent: Jul. 1, 2025

(54) ACCURACY MEASUREMENT KIT

(71) Applicant: Axiomtek Co., Ltd., New Taipei (TW)

(72) Inventors: Po-Cheng Chen, New Taipei (TW); Kao-Pin Lin, New Taipei (TW); Liang-Chin Wang, New Taipei (TW)

(73) Assignee: AXIOMTEK CO., LTD., New Taipei (TW)

( * ) Notice: Subject to any disclaimer, the term of this patent is extended or adjusted under 35 U.S.C. 154(b) by 401 days.

(21) Appl. No.: 18/105,927

(22) Filed: Feb. 6, 2023

(65) Prior Publication Data
US 2024/0169693 A1     May 23, 2024

(30) Foreign Application Priority Data
Nov. 17, 2022 (TW) .................. 111212593

(51) Int. Cl.
*G06V 10/74* (2022.01)
*G02F 1/29* (2006.01)
*G06T 7/90* (2017.01)
*G06V 10/141* (2022.01)

(52) U.S. Cl.
CPC .............. *G06V 10/761* (2022.01); *G02F 1/29* (2013.01); *G06T 7/90* (2017.01); *G06V 10/141* (2022.01); *G06T 2207/10024* (2013.01); *G06T 2207/30204* (2013.01); *G06T 2207/30252* (2013.01)

(58) Field of Classification Search
CPC ................ G06V 10/761; G06V 10/245; G06T 2207/30204; G06T 2207/30252; G06T 7/70; G06T 7/74

USPC .................................................. 382/103, 106
See application file for complete search history.

(56) References Cited

U.S. PATENT DOCUMENTS

2015/0115876 A1* 4/2015 Noh ....................... A47L 9/2873
                                                      320/107
2019/0120967 A1* 4/2019 Smits .................. G01C 21/3626

OTHER PUBLICATIONS

Daniel Becker, Fabian Thiele, Oliver Sawade, Ilja Radusch, "Cost-effective camera based ground truth for indoor localization", 2015 IEEE International Conference on Advanced Intelligent Mechatronics (AIM), IEE, Jul. 7, 2015 (Jul. 7, 2015), pp. 885-890, XP033210616, DOI: 10.1109/AIM.2015.7222650.

(Continued)

*Primary Examiner* — Jamares Q Washington
(74) *Attorney, Agent, or Firm* — Li & Cai Intellectual Property (USA) Office

(57) ABSTRACT

An accuracy measurement kit is provided and includes a marker, at least one light beam device, an image capture device, and a processing device. The marker is disposed on an autonomous mobile vehicle, and at least partially includes a reference pattern. The light beam device is configured to emit a light beam to the autonomous mobile vehicle located at a predetermined position so as to form a light spot on the marker. The processing device is configured to capture the light spot the marker on the autonomous mobile vehicle for generating a to-be-analyzed image. The processing device is configured to obtain an offset of the autonomous mobile vehicle in an X-axis direction and a Y-axis direction by calculating images of the to-be-analyzed image corresponding to the reference pattern and the light spot.

14 Claims, 11 Drawing Sheets

(56) References Cited

OTHER PUBLICATIONS

Simone Ceriani, Giulio Fontana, Alessandro Giusti, Daniele Marzorati, Matteo Matteucci, Davide Migliore, Davide Rizzi, Domenico G. Sorrenti, Pierluigi Taddei, "Rawseeds ground truth collection systems for indoor self-localization and mapping", Autonomous Robots, Kluwer Academic Publishers, BO, vol. 27, No. 4, Sep. 22, 2009 (Sep. 22, 2009), pp. 353-371, XP019746148, ISSN: 1573-7527, DOI: 10.1007/S10514-009-9156-5.

Harsha Kikkeri, Gershon Parent, Mihai Jalobeanu, Stan Birchfield, "An Inexpensive Method for Evaluating the Localization Performance of a Mobile Robot Navigation System", 2014 IEEE International Conference on Robotics and Automation (ICRA), IEEE, May 31, 2014 (May 31, 2014), pp. 4100-4107, XP032650672, DOI: 1109/ICRA.2014.6907455.

\* cited by examiner

ACCURACY MEASUREMENT KIT

CROSS-REFERENCE TO RELATED PATENT APPLICATION

This application claims the benefit of priority to Taiwan Patent Application No. 111212593, filed on Nov. 17, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an accuracy measurement kit, and more particularly to an accuracy measurement kit for measuring a movement accuracy of an autonomous mobile vehicle.

BACKGROUND OF THE DISCLOSURE

In the related art, there is no technology capable of measuring movement accuracy for autonomous mobile vehicles, such as an autonomous mobile robot (AMR) or an automated guided vehicle (AGV) from various different factories. Specifically, after a user purchases the AMR or the AGV, a movement accuracy of the autonomous mobile vehicle (i.e., the AMR or the AGV) can only be obtained from manuals or specifications provided by the manufacturer, a true movement accuracy of the autonomous mobile vehicle cannot be verified.

SUMMARY OF THE DISCLOSURE

In response to the above-referenced technical inadequacy, the present disclosure provides an accuracy measurement kit to effectively improve on the issues associated with the lack of concrete means for measuring movement accuracy of conventional autonomous mobile vehicles.

In order to solve the above-mentioned problems, one of the technical aspects adopted by the present disclosure is to provide an accuracy measurement kit for measuring an accuracy of an autonomous mobile vehicle after being moved to a predetermined position. The accuracy measurement kit includes at least one marker, at least one light beam device, an image capture device, and a calculating device. The at least one marker includes a reference pattern and is configured to be disposed on the autonomous mobile vehicle. The at least one light beam device is configured to be disposed on a periphery of the predetermined position. The at least one light beam device is configured to emit a light beam onto the at least one marker on the autonomous mobile vehicle located at the predetermined position so as to form a light spot on the at least one marker. The image capture device is configured to be disposed on one of the autonomous mobile vehicle and the periphery of the predetermined position. The calculating device is electrically coupled to the image capture device. The calculating device is configured to control the image capture device to capture the light spot and the at least one marker on the autonomous mobile vehicle located at the predetermined position for generating a to-be-analyzed image. The to-be-analyzed image includes a reference pattern image corresponding to the reference pattern of the at least one marker and a light spot image corresponding to the light spot. The calculating device is configured to process the to-be-analyzed image so as to obtain an X-axis distance in an X-axis direction and a Y-axis distance in a Y-axis direction of a center of the reference pattern image and a center of the light spot image. The calculating device is configured to convert the X-axis distance and the Y-axis distance into an X-axis true distance and a Y-axis true distance so as to generate a measurement coordinate according to a reference line of the reference pattern and a true length that is stored therein and corresponding to the reference line. The measurement coordinate includes the X-axis true distance and the Y-axis true distance. The calculating device is configured to average the X-axis true distances and the Y-axis true distances of a plurality of the measurement coordinates so as to obtain a regression center coordinate. The calculating device is configured to calculate the plurality of the measurement coordinates and the regression center coordinate to obtain an X-axis offset and a Y-axis offset of the autonomous mobile vehicle. The regression center coordinate and each of the plurality of the measurement coordinates have a difference in the X-axis direction therebetween and a difference in the Y-axis direction therebetween, the X-axis offset is defined as an average of a plurality of the differences in the X-axis direction, and the Y-axis offset is defined as an average of a plurality of the differences in the Y-axis direction.

In order to solve the above-mentioned problems, another one of the technical aspects adopted by the present disclosure is to provide an accuracy measurement kit for measuring an accuracy of an autonomous mobile vehicle after being moved to a predetermined position. The accuracy measurement kit includes at least one marker, at least one light beam device, an image capture device, and a calculating device. The at least one marker includes a reference pattern and is configured to be disposed on a periphery of the predetermined position. The at least one light beam device is configured to be disposed on the autonomous mobile vehicle. The at least one light beam device is configured to emit a light beam onto the at least one marker on the periphery of the predetermined position so as to form a light spot on the at least one marker. The image capture device is configured to be disposed on one of the autonomous mobile vehicle and the periphery of the predetermined position. The calculating device is electrically coupled to the image capture device. The calculating device is configured to control the image capture device to capture the light spot and the at least one marker on the periphery of the predetermined position for generating a to-be-analyzed image. The to-be-analyzed image includes a reference pattern image corresponding to the reference pattern of the at least one marker and a light spot image corresponding to the light spot. The calculating device is configured to process the to-be-analyzed image so as to obtain an X-axis distance in an X-axis direction and a Y-axis distance in a Y-axis direction of a center of the reference pattern image and a center of the light spot image. The calculating device is configured to convert the X-axis distance and the Y-axis distance into an X-axis true distance and a Y-axis true distance so as to generate a measurement coordinate according to a reference line of the reference pattern and a true length that is stored therein and that corresponds to the reference line. The measurement coordinate includes the X-axis true distance and the Y-axis true distance. The calculating device is configured to average the X-axis true distances and the Y-axis true distances of a plurality of the measurement coordinates so as to obtain a regression center coordinate. The calculating device is configured to calculate the plurality of the measurement coordinates and the regression center coordinate to obtain an X-axis offset and a Y-axis offset of the autonomous mobile vehicle. The regression center coordinate and each of the plurality of the measurement coordinates have a difference in the X-axis direction therebetween and a difference in the Y-axis direction therebetween, the X-axis offset is defined as an average of a plurality of the differences in the X-axis direction, and the Y-axis offset is defined as an average of a plurality of the differences in the Y-axis direction.

Therefore, the accuracy measurement kit of the present disclosure can be provided to measure the accuracy of the autonomous mobile vehicle when the autonomous mobile vehicle is moved to the predetermined position, so that an operating personnel can clearly know whether a movement accuracy of related controlling system of the autonomous mobile vehicle satisfies practical requirements.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
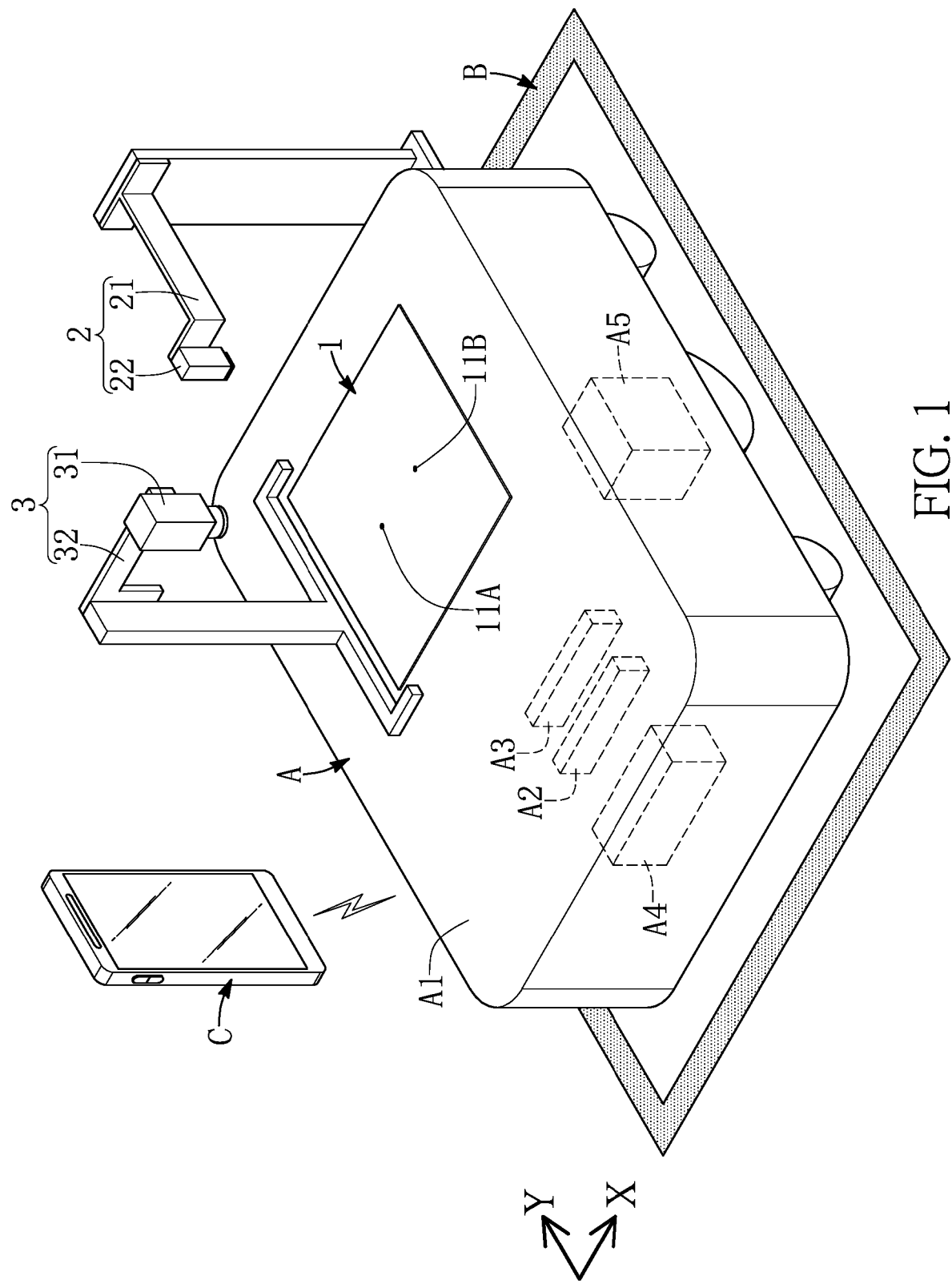
FIG. 1 is a schematic perspective view of an autonomous mobile vehicle according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

FIG. 1 is a perspective view of an autonomous mobile vehicle according to the present disclosure. The autonomous mobile vehicle A of the present disclosure includes a marker 1, a vehicle body A1, a calculating device A2 (or a computing device A2), a processing device A3, a detecting device A4, and a driving device A5 that is disposed in the vehicle body A1. The calculating device A2 is provided to perform an accuracy measurement method of an autonomous mobile vehicle of the present disclosure, and the calculating device A2 is electrically connected to the processing device A3. The calculating device A2 can be any kind of industrial computer or a computer device having any kind of processing chip, but the present disclosure is not limited thereto. The autonomous mobile vehicle A of the present disclosure can be applied to a vehicle having an autonomous path planning function, such as: an autonomous mobile robot (AMR), an automated guided vehicle (AGV), a robot vacuum cleaner, or a self-driving car.

The detecting device A4 is configured to detect a surrounding environment of the autonomous mobile vehicle A to generate a detection information, and the detecting device A4 is configured to transmit the detection information to the processing device A3. The driving device A5 is electrically connected to the processing device A3. The processing device A3 is configured to control the driving device A5 to be operated according to the detection information, so that the autonomous mobile vehicle A is moved to a predetermined position. In order to clearly show the present disclosure, the drawings of the present embodiment use a marking circle B to show the predetermined position. The specific operation of any one of the processing device A3, the detecting device A4, and the driving device A5 is identical to that of a conventional AMR, and is not described herein for the sake of brevity.

When the autonomous mobile vehicle A is measured in accuracy, the light beam device 2 can be disposed on a periphery of the predetermined position by the relevant personnel, the image capture device 3 is disposed on an upper surface of the autonomous mobile vehicle A, and the upper surface of the autonomous mobile vehicle A is provided with the marker 1 thereon. The light beam device 2 can include a supporting frame 21 and a light beam generator 22 that is disposed on the periphery of the predetermined position through the supporting frame 21. The image capture device 3 can include a supporting frame 32 and an image capture member 31 that is disposed on autonomous mobile vehicle A through the supporting frame 32.

The calculating device A2 can be electrically coupled to the image capture device 3 in a wire connection or a wireless connection. The calculating device A2 is configured to control the image capture device 3 to capture an image of the marker 1 disposed on the autonomous mobile vehicle A, and is configured to receive a to-be-analyzed image 33 transmitted from the image capture device 3. In other embodiments of the present disclosure, the calculating device A2 can control the light beam device 2 to be opened or closed.

Furthermore, in other embodiments of the present disclosure, the calculating device A2 can be independently sold, operated, or manufactured, and the calculating device A2 is not limited to being sold or manufactured with the autonomous mobile vehicle A. In one embodiment of the present disclosure (e.g., where the calculating device A2 is independently sold), after the calculating device A2 is purchased, the calculating device A2 can be separately assembled to an autonomous mobile vehicle (e.g., an AMR or an AVG) and is connected to the processing device A3 of the autonomous mobile vehicle.

In one embodiment of the present disclosure (e.g., where the calculating device A2 is independently sold), the calculating device A2 can be a remote server or a cloud server in a factory. Moreover, in one embodiment of the present disclosure (e.g., where the calculating device A2 is independently sold), the calculating device A2 can be assembled in a housing with the light beam device 2 or the image capture device 3.

Figure 2:
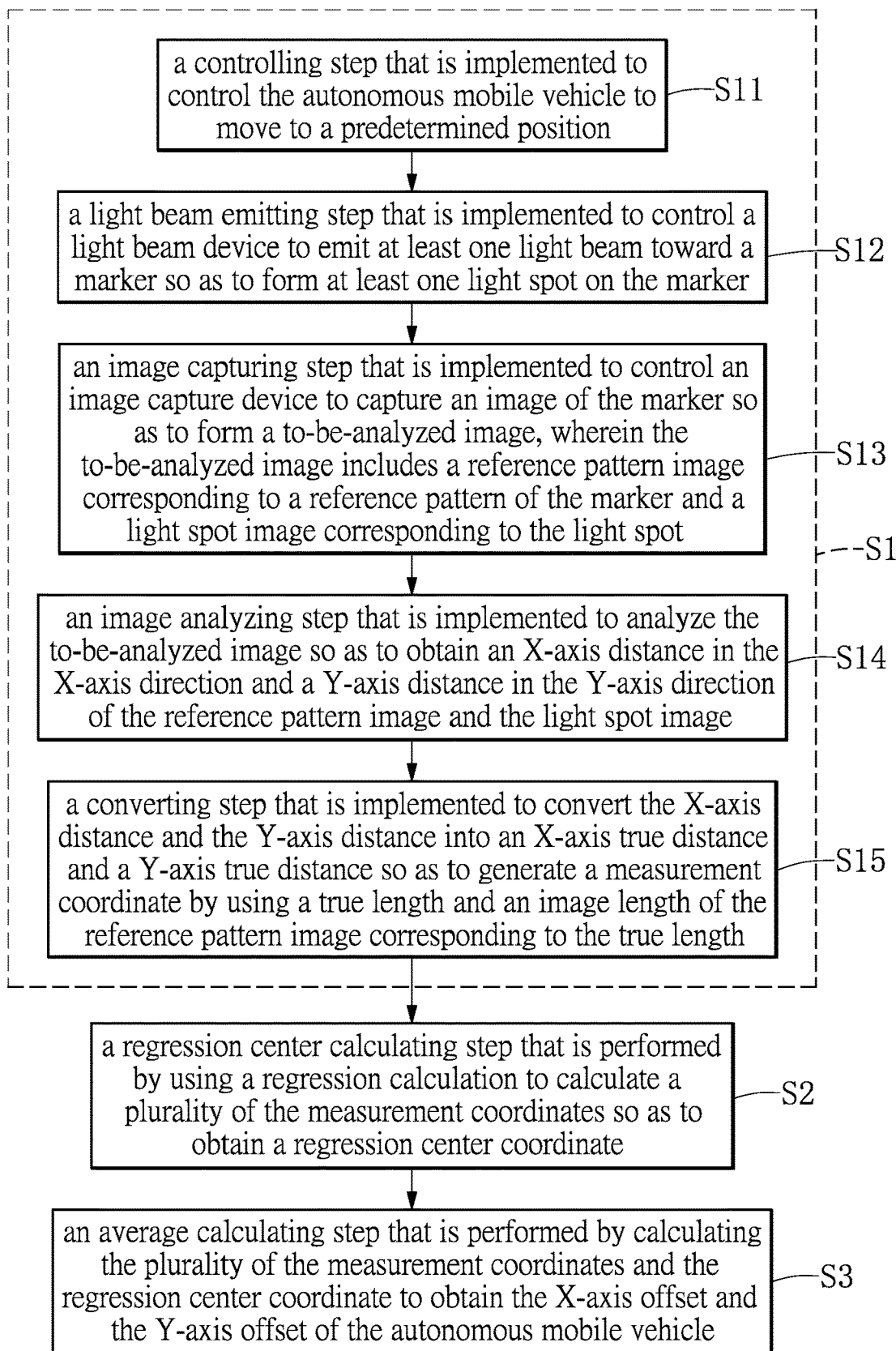
FIG. 2 is a flowchart of an accuracy measurement method of the autonomous mobile vehicle according to a first embodiment of the present disclosure.
Figure 3:
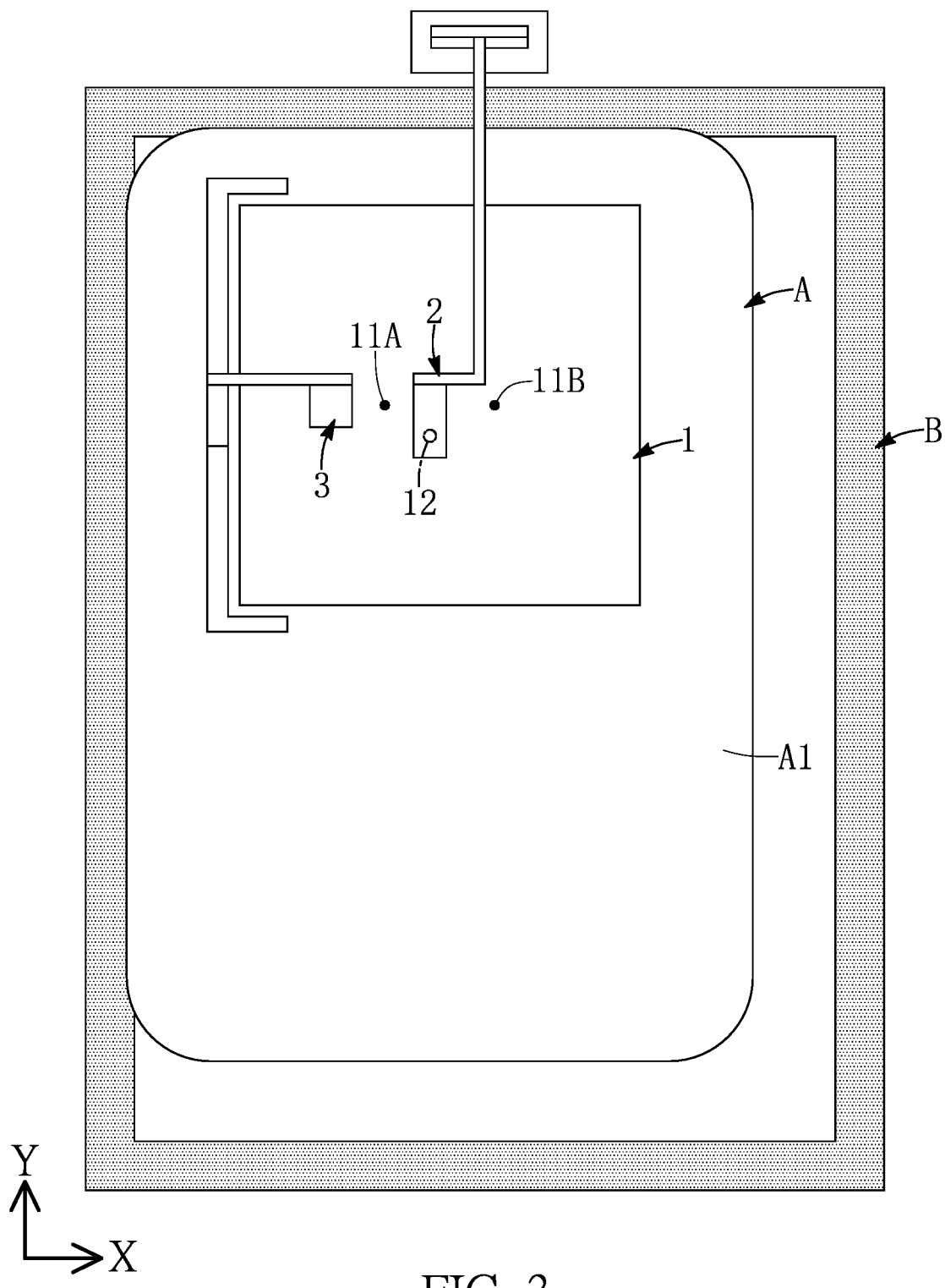
FIG. 3 is a top view showing the autonomous mobile vehicle moved to a predetermined position according to the present disclosure.
Figure 4:
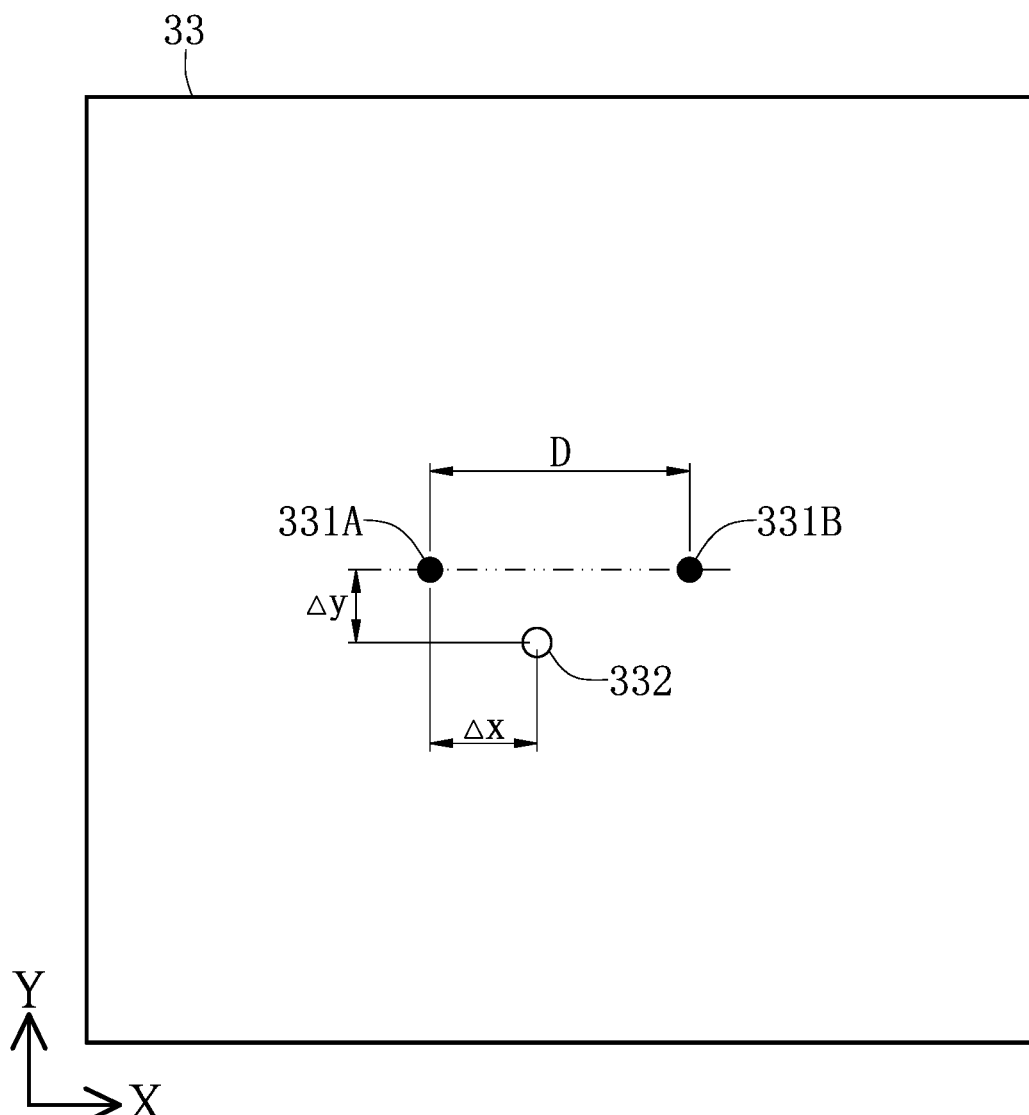
FIG. 4 is a schematic view showing a to-be-analyzed image of the accuracy measurement method according to the first embodiment of the present disclosure.

As shown in FIG. 1 to FIG. 4, FIG. 2 is a flowchart of the accuracy measurement method of the autonomous mobile vehicle according to the present disclosure, FIG. 3 is a top view showing the autonomous mobile vehicle moved to the predetermined position according to the present disclosure, and FIG. 4 is a schematic view showing the to-be-analyzed image of the accuracy measurement method according to the first embodiment of the present disclosure.

The accuracy measurement method of the autonomous mobile vehicle in the present disclosure is provided to measure an X-axis offset and a Y-axis offset of an autonomous mobile vehicle A respectively along an X-axis direction and a Y-axis direction. The accuracy measurement method of the autonomous mobile vehicle is described as follows.

The accuracy measurement method is implemented by repeatedly performing a distance calculating step S1 for a predetermined number of times, and then performing a regression center calculating step S2 and an average calculating step S3. The distance calculating step S1 includes the following steps.

A controlling step S11 is implemented to control the autonomous mobile vehicle A to move to the predetermined position (e.g., marked by the marking circle B shown in FIG. 3).

A light beam emitting step S12 is implemented to control the light beam device 2 to emit at least one light beam toward the marker 1 so as to form at least one light spot 12 on the marker 1.

An image capturing step S13 is implemented to control the image capture device 3 to capture an image of the marker 1 so as to form the to-be-analyzed image 33. The to-be-analyzed image 33 includes a reference pattern image corresponding to a reference pattern (to be described in further detail below) of the marker 1, and a light spot image 332 corresponding to the light spot 12.

An image analyzing step S14 is implemented to analyze the to-be-analyzed image 33 so as to obtain an X-axis distance $\Delta x$ in the X-axis direction and a Y-axis distance $\Delta y$ in the Y-axis direction of the reference pattern image and the light spot image 332.

A converting step S15 is implemented to convert the X-axis distance $\Delta x$ and the Y-axis distance $\Delta y$ into an X-axis true distance and a Y-axis true distance so as to generate a measurement coordinate by using a true length and an image length D of the reference pattern image that corresponds to the true length. The measurement coordinate includes the X-axis true distance and the Y-axis true distance.

In a practical application, the image analyzing step S14 can be implemented by using an open source computer vision (OpenCV) library to obtain a color of each of reference spots on the marker, processing the to-be-analyzed image in binarization manner to obtain a processed image, processing the processed image in an erosion and dilation manner to remove noise of the processed image, processing the processed image in an edge detection manner to recognize an edge of each of the reference spot images of the processed image, and calling a findContours( ) function in the OpenCV library to obtain a reference spot image center coordinate of each of the reference spot images of the processed image. In the same way, the to-be-analyzed image is processed in a binarization manner through the color of the light spot on the marker, and the above processes are implemented to obtain a light spot image center coordinate. After each of the reference spot image center coordinates and the light spot image center coordinate are obtained, the X-axis distance $\Delta x$ and the Y-axis distance $\Delta y$ can be obtained by calculation.

The regression center calculating step S2 is performed by using a regression calculation to calculate a plurality of the measurement coordinates so as to obtain a regression center coordinate. In a practical application, the regression calculation can be implemented by averaging a sum of the X-axis coordinates of the measurement coordinates to obtain an X-axis coordinate of the regression center coordinate, and can be implemented by averaging a sum of the Y-axis coordinates of the measurement coordinates to obtain a Y-axis coordinate of the regression center coordinate.

The average calculating step S3 is performed by calculating the plurality of the measurement coordinates and the regression center coordinate to obtain the X-axis offset and the Y-axis offset of the autonomous mobile vehicle A. The regression center coordinate and each of the plurality of the measurement coordinates have a difference in the X-axis direction therebetween and a difference in the Y-axis direction therebetween, the X-axis offset is defined as an average of a plurality of the differences in the X-axis direction, and the Y-axis offset is defined as an average of a plurality of the differences in the Y-axis direction.

The predetermined positions in the controlling steps S11 can be the same or different from each other according to practical requirements. If the predetermined positions in the controlling steps S11 are different from each other, each of the predetermined positions needs to be arranged with the light beam device 2 or the image capture device 3.

The predetermined number of times is greater than or equal to two times, but the present disclosure is not limited thereto. In one embodiment of the present disclosure (e.g., the autonomous mobile vehicle A is an AMR), when the autonomous mobile vehicle A is moved to the same predetermined position in each movement, the autonomous mobile vehicle A may be parked at slightly different angles or positions due to various factors. Accordingly, the X-axis offset and the Y-axis offset can be obtained by performing the regression center calculating step S2 and the average calculating step S3 after the distance calculating steps S1 is repeatedly performed for the predetermined number of times, so that the X-axis offset and the Y-axis offset can be close to a true offset of the autonomous mobile vehicle A in the X-axis direction and the Y-axis direction when the autonomous mobile vehicle A is moved to the predetermined position in each movement. In one embodiment of the present disclosure, the accuracy measurement method of the autonomous mobile vehicle is provided for a general detection standard of AMR (e.g., AMRA-201 Mobile Robot—General Requirements and Testing Methods), the predetermined number of times is greater than or equal to 30 times, such that the X-axis offset and the Y-axis offset can be ensured to represent the true offset of the AMR in the X-axis direction and the Y-axis direction in a sufficiently accurate manner.

In a practical application, the light beam device 2 can be a laser device that is configured to emit at least one laser beam, but the present disclosure is not limited thereto. As long as the light beam device 2 is capable of forming a light spot on the marker 1 that is able to be recognized by general image recognition software (e.g., an image recognition software using the OpenCV library), the light beam device 2 can be one that emits any kind of light beams.

In the present embodiment, the light beam device 2 is disposed on the periphery of the predetermined position, and the marker 1 is disposed on the autonomous mobile vehicle A, but the present disclosure is not limited thereto. In other embodiments of the present disclosure, the light beam device 2 can be disposed on the autonomous mobile vehicle A, the marker 1 can be disposed on the periphery of the predetermined position, and under the condition that the image capture device 3 can correctly capture an image of the marker 1, the image capture device 3 can be disposed on the autonomous mobile vehicle A or the periphery of the predetermined position.

In one embodiment of the present disclosure (e.g., the light beam device 2 is disposed on the autonomous mobile vehicle A, and the marker 1 is disposed on the periphery of the predetermined position), the image capture device 3 can be an electronic device built-in the autonomous mobile vehicle A; in other words, if an image capture device built-in the autonomous mobile vehicle A can capture the marker 1 disposed on the periphery of the predetermined position, the autonomous mobile vehicle A does not need to be additionally assembled with other image capture devices.

The marker 1 can be a component independent from the autonomous mobile vehicle A, or can be detachably disposed on the autonomous mobile vehicle A. For example, the marker 1 can be a sticker, one side of the marker 1 is printed with the reference pattern, and another side of the marker 1 is adhered to a releasing film, so that after the releasing film is removed by a user, the marker 1 can be adhered to the upper surface of the autonomous mobile vehicle A through an adhesive layer of the marker 1. The adhesive layer can be made of any kind of adhesive, and is preferably a re-attachable adhesive. The marker 1 is not limited to the sticker. In other embodiments of the present disclosure, one side of the marker 1 can be disposed with a magnet layer, and the marker 1 can be magnetically attached to the upper surface of the autonomous mobile vehicle A through the magnet layer.

The reference pattern can include two reference spots 11A, 11B. In a practical application, the two reference spots 11A, 11B can be printed on the marker 1. The two reference spots 11A, 11B are not limited to the drawings and can be designed according to practical requirements. In the drawings of the present embodiment, the reference pattern only includes the two reference spots 11A, 11B, but is not limited thereto. Aside from the two reference spots 11A, 11B, the reference pattern can also include other identification patterns according to practical requirements. For example, the reference pattern can be a trademark logo or a 2D barcode each having the two reference spots 11A, 11B.

In the image analyzing step S14, after the calculating device A2 recognizes two reference spot images 331A, 331B from the to-be-analyzed image 33 respectively corresponding to the two reference spots 11A, 11B, the light spot 332 and one of the two reference spot images 331A, 331B are calculated to obtain the X-axis distance Δx and the Y-axis distance Δy. In the converting step S15, a line connecting centers of the two reference spot images 331A, 331B has a length that is defined as an image length D, and the image length D is in cooperation with the true length to respectively convert the X-axis distance Δx and the Y-axis distance Δy into the X-axis true distance and the Y-axis true distance.

In a practical application, any kind of factors of the to-be-analyzed image 33 (e.g., a placing position of the image capture device 3 with respect to the marker 1 or a magnification of the image capture device 3 capturing the marker 1) may result in an issue where the image length D of the to-be-analyzed image 33 is different from the true length. Accordingly, the converting step S15 is provided to effectively improve on or solve this issue after the image analyzing step S14 is performed, thereby obtaining the X-axis true distance and the Y-axis true distance which are close to real-world conditions.

In order to for the X-axis distance Δx and the Y-axis distance Δy obtained at each time to have a reference value, each time the distance calculating step S1 is performed, the reference spot image of the to-be-analyzed image 33 corresponding to the same one of the two reference spots of the reference pattern and the light spot image 332 are calculated to obtain the X-axis distance Δx and the Y-axis distance Δy, such that the X-axis distance Δx and the Y-axis distance Δy can be ensured to have a reference value after the distance calculating step S1 is performed.

In other embodiments of the present disclosure, the reference pattern can include a reference spot and a reference line, which are formed on the marker 1 and spaced apart from each other; in the image analyzing step S14, the calculating device A2 is configured to calculate a center of the light spot image and a center of the reference spot image in the to-be-analyzed image so as to obtain the X-axis distance Δx and the Y-axis distance Δy; and the image length in the converting step S15 can be a length of a reference line image in the to-be-analyzed image corresponding to the reference line.

Figure 5:
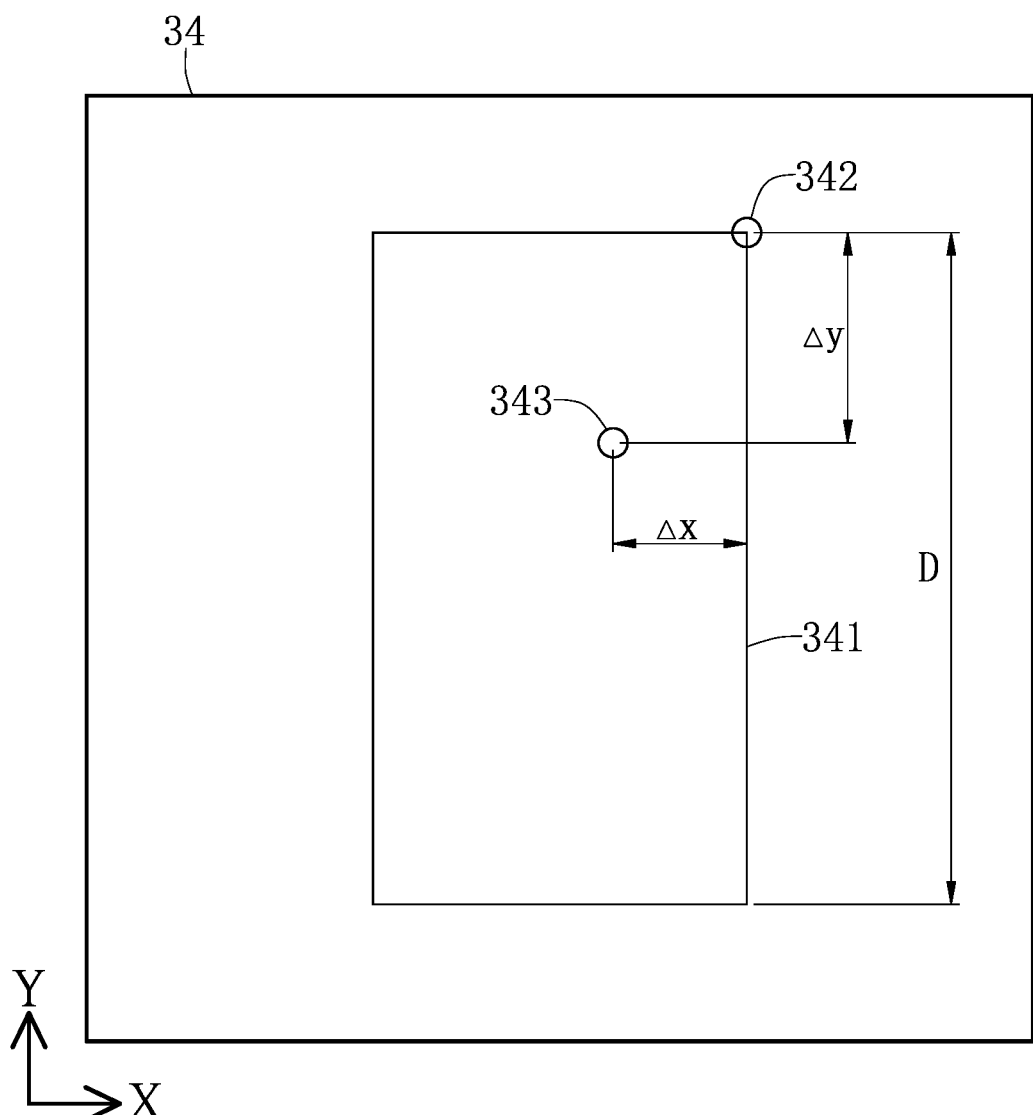
FIG. 5 is a schematic view showing the to-be-analyzed image of the accuracy measurement method according to one embodiment of the present disclosure.

As shown in FIG. 2 and FIG. 5, FIG. 5 is a schematic view showing the to-be-analyzed image of the accuracy measurement method according to one embodiment of the present disclosure. The difference between the present embodiment and the above embodiments is described as follows. The marker in the present embodiment can be a part (e.g., a vehicle housing) of the autonomous mobile vehicle. The to-be-analyzed image can include an edge image 341 corresponding to an edge of the vehicle housing (i.e., the marker). In the image analyzing step S14, the X-axis distance Δx and the Y-axis distance Δy are obtained by calculating an end spot 342 of the edge image 341 and the center of the light spot image 343. In the converting step S15, the image length D is a length of the edge image 341, and the true length is a length of the edge of the vehicle housing. In other embodiments of the present disclosure, the marker can be other components of the autonomous mobile vehicle and is not limited to the vehicle housing.

In summary, the accuracy measurement method, the calculating device capable of performing the accuracy measurement method, and the autonomous mobile vehicle having the calculating device in the present disclosure can each be provided to obtain the X-axis offset and the Y-axis offset of the autonomous mobile vehicle when moving to the predetermined position, and the relevant personnel can confirm whether the X-axis offset and the Y-axis offset of the autonomous mobile vehicle falls within the accuracy tolerance range claimed by the manufacturer. In addition, after the relevant personnel obtains the X-axis offset and the Y-axis offset of the autonomous mobile vehicle, the autonomous mobile vehicle can be used at a suitable location with a collision issue due to an offset of the autonomous mobile vehicle being significantly reduced.

For example, if the autonomous mobile vehicle A is moved to the predetermined position as shown in FIG. 3, the calculating device A2 can be operated to obtain that the X-axis offset is −5 cm and the Y-axis is +5 cm. However, an accuracy tolerance of the autonomous mobile vehicle A in any one of the X-axis direction and the Y-axis direction is ±1 cm as described in the manuals. Accordingly, the user can know that the autonomous mobile vehicle A does not meet the accuracy tolerance range (e.g., ±1 cm) claimed by the manufacturer.

In the related art, there is no tool, apparatus, or method that can be used to detect an accuracy (e.g., the X-axis offset and the Y-axis offset) of the autonomous mobile vehicle, so that the relevant personnel has no other option but to take the word of the manufacturer. Only when a collision of the autonomous mobile vehicle occurs at the location where it is deployed (e.g., factory premises) can users become aware that there may be a discrepancy between the actual accuracy of the autonomous mobile vehicle, and the accuracy that is advertised by the manufacturer. This can lead to all kinds of inconveniences for relevant personnel; inconveniences which the present disclosure aims to address.

As shown in FIG. 1, in one embodiment of the present disclosure, the calculating device A2 can be electrically coupled to an external electronic device C (e.g., in a wireless connection) for obtaining the true length and the predetermined number of times from the external electronic device C or receiving an amended information transmitted from the external electronic device C to amend at least one of the true length and the predetermined number of times stored therein. For example, the external electronic device C can be a smartphone, a tablet computer, a notebook computer, a desktop computer, or a remote server, and when the external electronic device C performs a predetermined application (APP) and is electrically coupled to the calculating device A2, the external electronic device C can emit signals relating to the true length, the predetermined number of times, and the amended information, to the calculating device A2.

Preferably, after the average calculating step S3, the calculating device A2 further performs an outputting step by outputting the X-axis offset and the Y-axis offset to the external electronic device C. In other words, after the calculating device A2 performs the accuracy measurement method of the present disclosure, the calculating device A2 can transmit the X-axis offset and the Y-axis offset to the external electronic device C, so that the relevant personnel can obtain the X-axis offset and the Y-axis offset by observing the external electronic device C.

As shown in FIG. 1, in a practical application, the calculating device A2 is electrically connected to the processing device A3; for example, the calculating device A2 can emit a query signal to the processing device A3 for learning whether the autonomous mobile vehicle A is moved to the predetermined position; or, when the autonomous mobile vehicle A is moved to the predetermined position, the processing device A3 can proactively send a relevant signal to the calculating device A2, informing the calculating device A2 that the autonomous mobile vehicle A is moved to the predetermined position, so that subsequent steps (e.g., the light-beam emitting step) can be performed.

In one embodiment of the present disclosure (e.g., the calculating device A2 is independent from the autonomous mobile vehicle A), when the autonomous mobile vehicle A is automatically moved to the predetermined position, the relevant personnel can trigger the calculating device A2, the light beam device 2, and the image capture device 3 to be operated for performing the accuracy measurement method of the autonomous mobile vehicle of the present disclosure.

In summary, the accuracy measurement method, the calculating device capable of performing the accuracy measurement method, and the autonomous mobile vehicle having the calculating device in the present disclosure can each be provided to allow the relevant personnel to clearly obtain the X-axis offset and the Y-axis offset of the autonomous mobile vehicle when the autonomous mobile vehicle is moved to the predetermined position, so that an operating relevant personnel can better plan the movement range of the autonomous mobile vehicle at the location (e.g., the factory premises), which can significantly reduce the probability of collision when the autonomous mobile vehicle moves in the area.

In addition, the accuracy measurement method, the calculating device capable of performing the accuracy measurement method, and the autonomous mobile vehicle having the calculating device in the present disclosure can each be provided to assist the relevant personnel to better adjust the related software and hardware of the autonomous mobile vehicle, so that the autonomous mobile vehicle can be moved to the predetermined position more accurately. In the related art, during the research and development of the software and hardware of the autonomous mobile vehicle, the relevant personnel is only able to manually judge whether the autonomous mobile vehicle has correctly moved to the predetermined position, which can cause inconveniences to relevant personnel.

Figure 6:
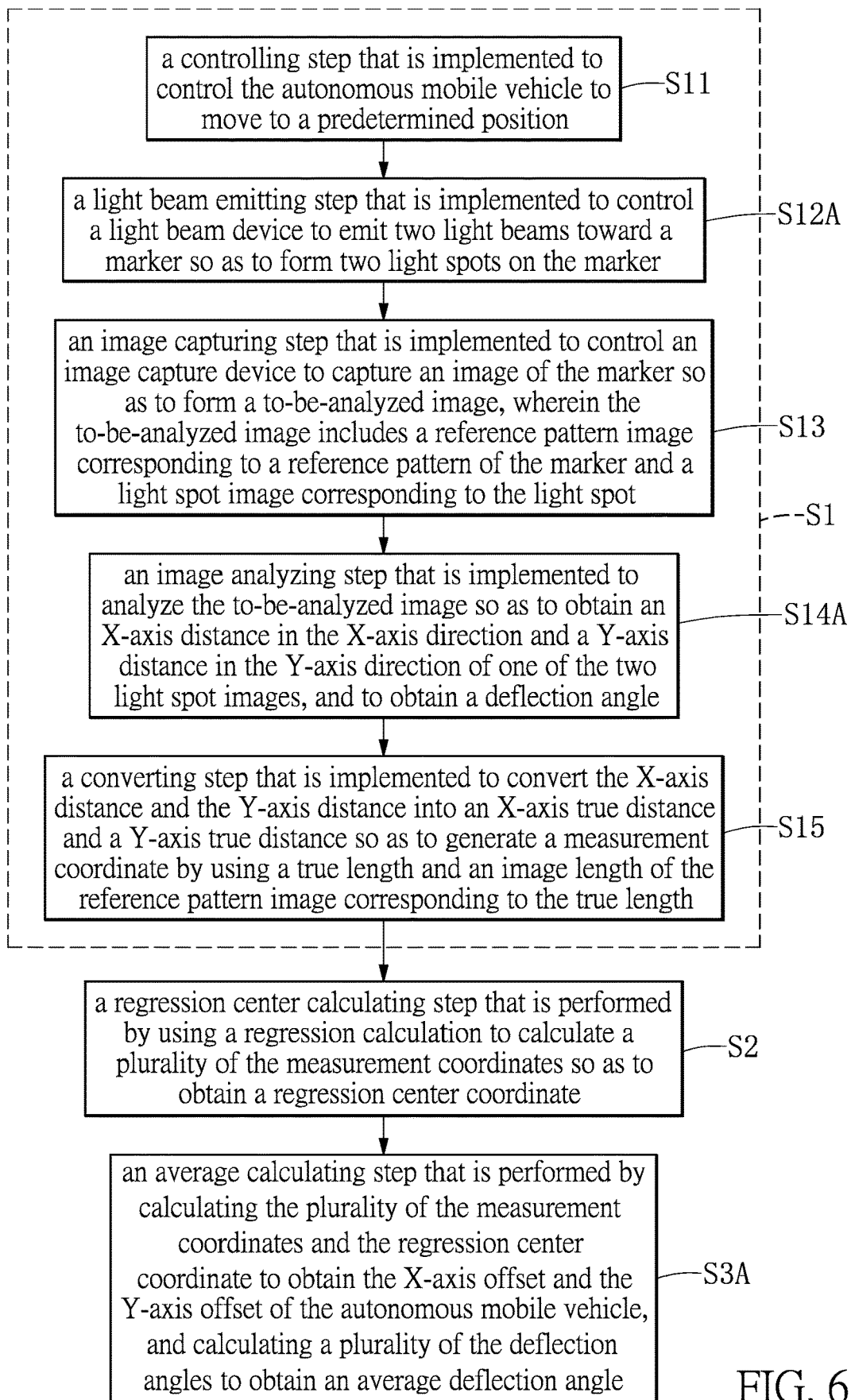
FIG. 6 is a flowchart of the accuracy measurement method of the autonomous mobile vehicle according to a second embodiment of the present disclosure.
Figure 7:
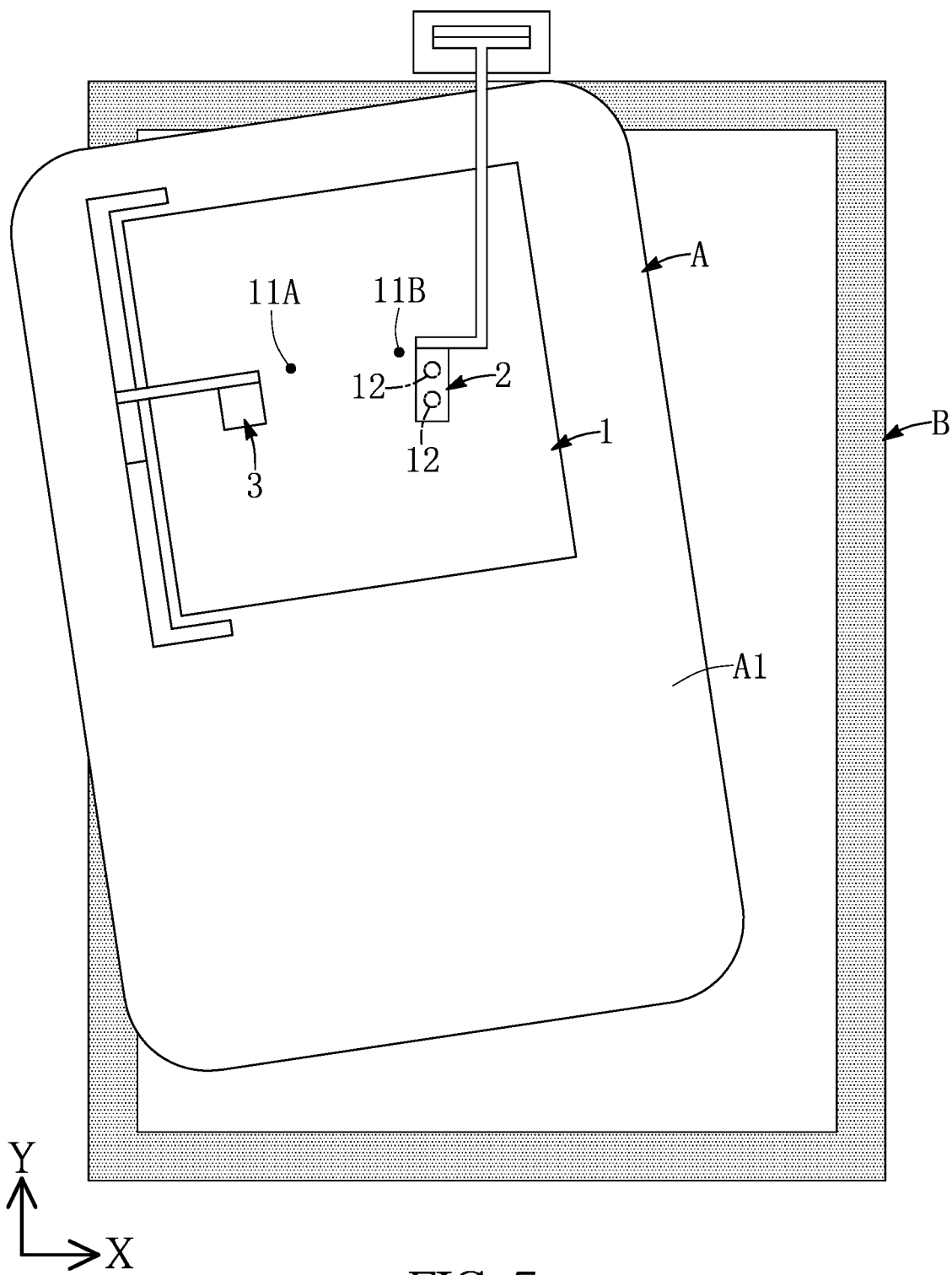
FIG. 7 is a top view of the autonomous mobile vehicle, a light beam device, and an image capture device according to the present disclosure.
Figure 8:
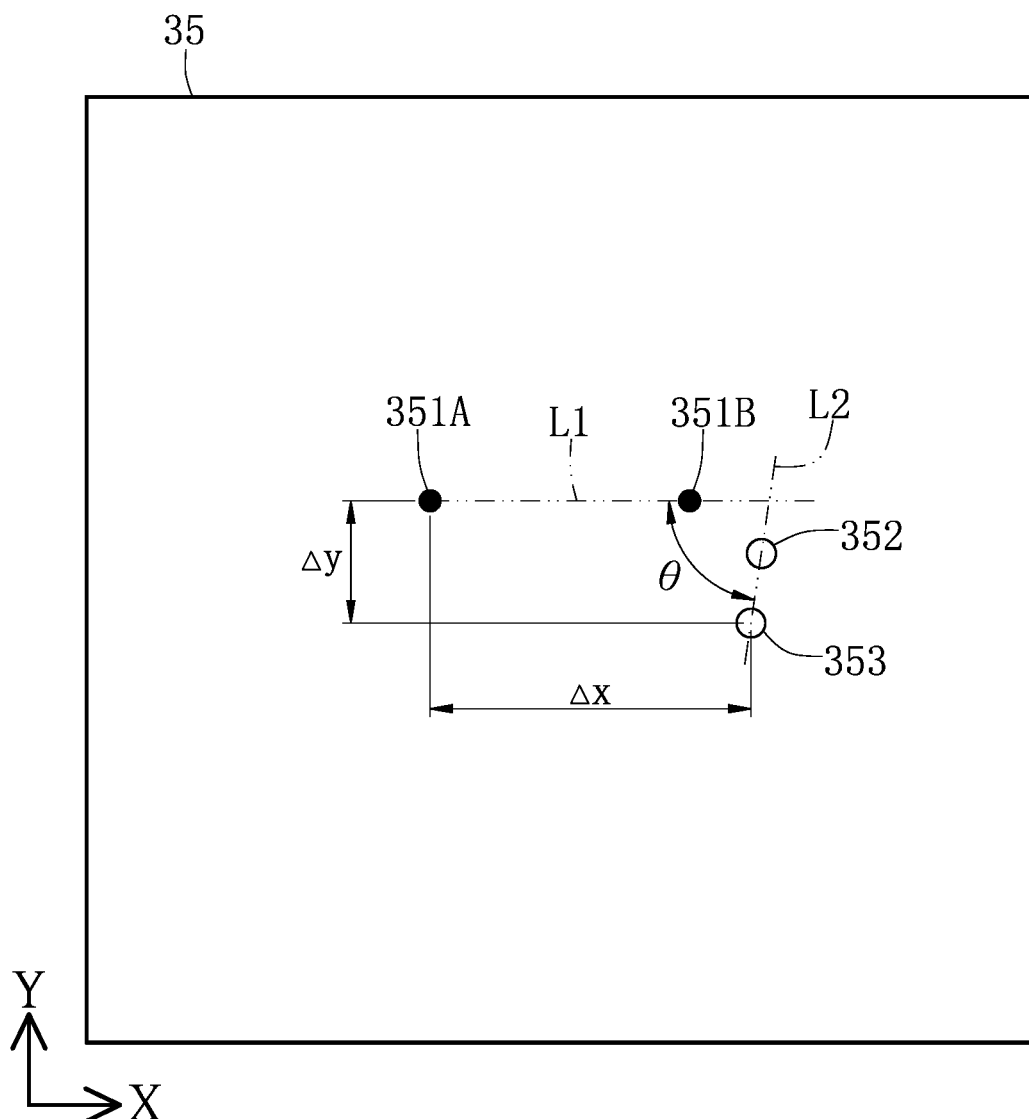
FIG. 8 is a schematic view showing the to-be-analyzed image of the accuracy measurement method according to the second embodiment of the pre sent disclosure.

As shown in FIG. 6 to FIG. 8, FIG. 6 is a flowchart of the accuracy measurement method of the autonomous mobile vehicle according to a second embodiment of the present disclosure, FIG. 7 is a top view of the autonomous mobile vehicle, the light beam device, and the image capture device according to the present disclosure, and FIG. 8 is a schematic view showing the to-be-analyzed image of the accuracy measurement method according to the second embodiment of the present disclosure.

The main difference between the present embodiment and the above embodiments is described as follows. In the light beam emitting step S12A, the light beam device 2 is controlled to emit two of the light beams toward the marker 1 so as to form two light spots 12 on the marker 1, the two light spots 12 not overlapping with each other. In the image analyzing step S14A, the to-be-analyzed image 35 is calculated to obtain a deflection angle θ, and the deflection angle θ is an included angle defined by a line L1 connecting the centers of the two reference spot images 351A, 351B and a line L2 connecting centers of the two light spot images 352, 353. Furthermore, in the average calculating step S3A, an average deflection angle is obtained by calculating a plurality of the deflection angles θ, and the average deflection angle is defined as an average of the deflection angles θ.

It should be noted that in each of the image analyzing steps S14a, the reference spot image 351A corresponding to the same one of the two reference spots of the reference pattern and the same one (e.g., the light spot image 353) of the two light spot images 352, 353 are calculated to obtain the X-axis distance Δx and the Y-axis distance Δy. In the present embodiment, the light beam device 2 is used to form two light spots 12 on the marker 1 that have the same shape. In other embodiments of the present disclosure, the light beam device 2 can be used to form two light spots 12 on the marker 1 that have different shapes.

In summary, the accuracy measurement method of the autonomous mobile vehicle in the present disclosure can be used not only to obtain the X-axis offset and the Y-axis offset of the autonomous mobile vehicle by calculation, but also used to obtain the average deflection angle of the autonomous mobile vehicle by calculation.

Figure 9:
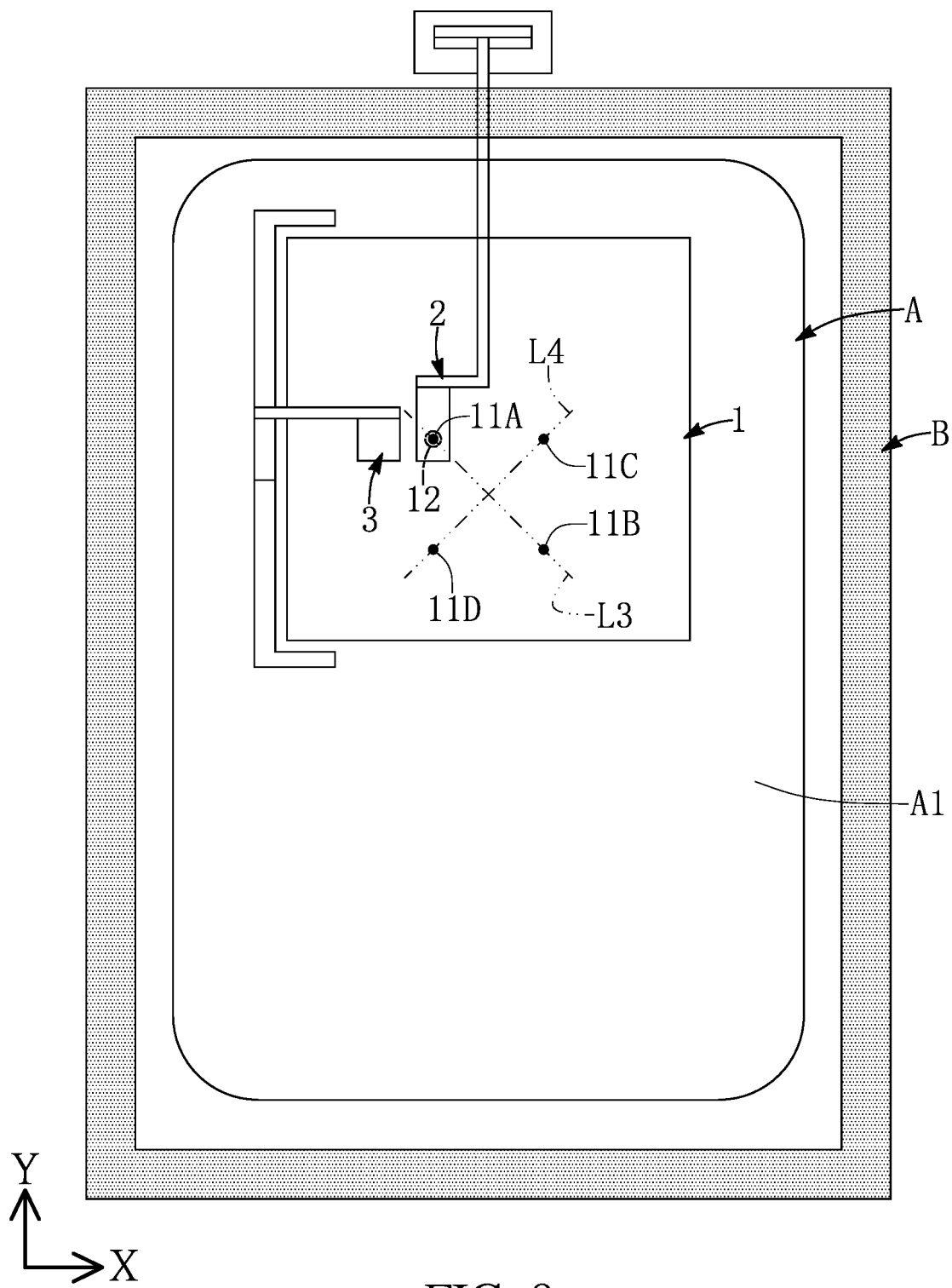
FIG. 9 is a top view of the autonomous mobile vehicle, the light beam device, and the image capture device according to a third embodiment of the pre sent disclosure.
Figure 10:
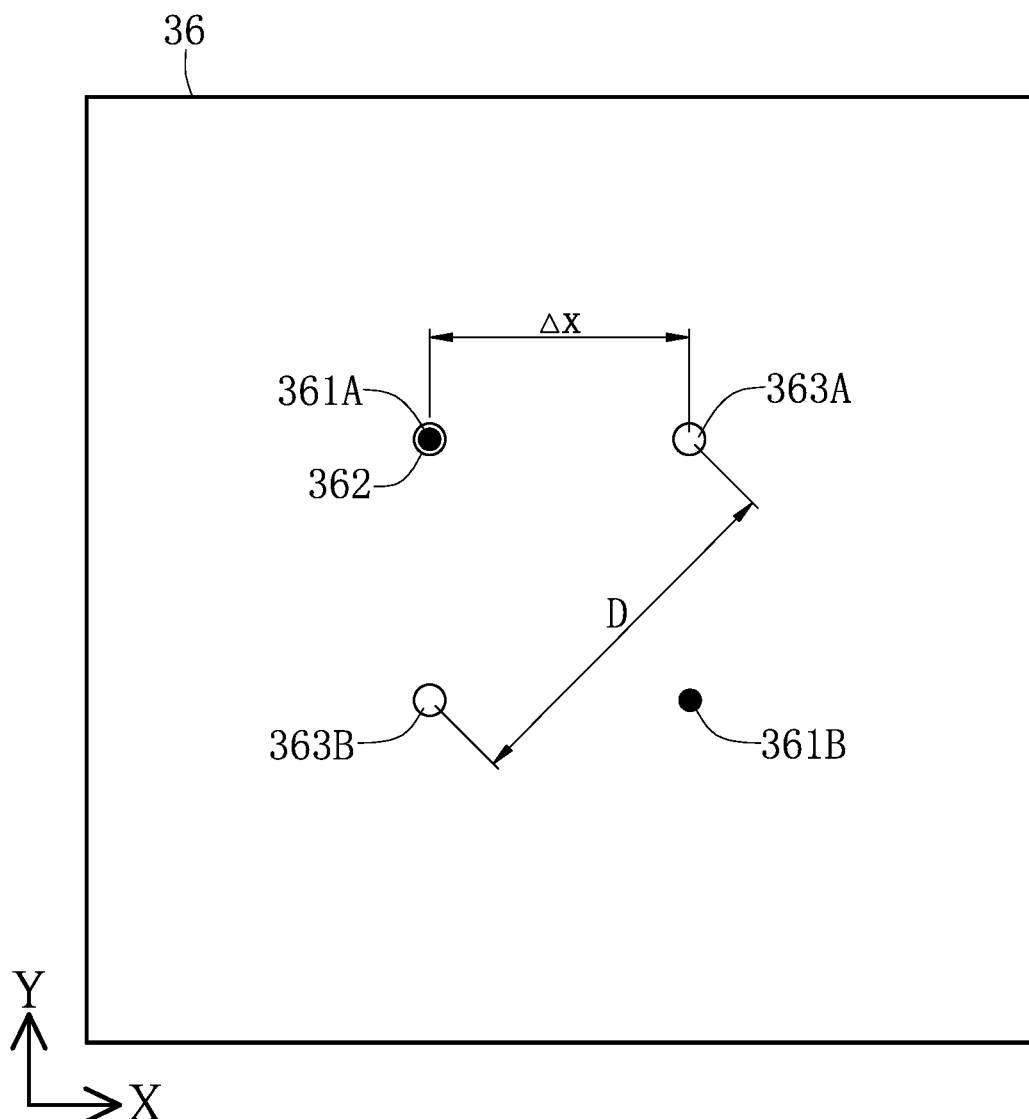
FIG. 10 is a schematic view showing the to-be-analyzed image of the accuracy measurement method according to the third embodiment of the present disclosure.

As shown in FIG. 9 and FIG. 10, FIG. 9 is a top view of the autonomous mobile vehicle, the light beam device, and the image capture device according to a third embodiment of the present disclosure, and FIG. 10 is a schematic view showing the to-be-analyzed image of the accuracy measurement method according to the third embodiment of the present disclosure. In a specific application of the present embodiment, the light beam emitting step is implemented by using the light beam device to emit a laser beam to form a laser light spot on the marker, and the predetermined number of times is at least 30 times.

The difference between the present embodiment and the above embodiments is described as follows. The reference pattern of the marker 1 further includes two auxiliary reference spots 11C, 11D located along a diagonal direction, and the two reference spots 11A, 11B are located along another diagonal direction. Moreover, a line L3 between the two reference spots 11A, 11B is not parallel to a line L4 between the two auxiliary reference spots 11C, 11D, and a length of the line L3 is equal to a length of the line L4. In a practical application, the line L3 between the two reference spots 11A, 11B can the line L4 between the two auxiliary reference spots 11C, 11D can be perpendicular to each other, and the two reference spots 11A, 11B and the two auxiliary reference spots 11C, 11D can be respectively located at four corner points of a rectangle. Preferably, the two reference spots 11A, 11B and the two auxiliary reference spots 11C, 11D can be respectively located at four corners of an imaginary square.

The two reference spots 11A, 11B on the marker 1 are the same, the two auxiliary reference spots 11C, 11D on the marker 1 are the same, and each of the two reference spots 11A, 11B, each of the two auxiliary reference spots 11C, 11D, and the light spot 12 on the marker 1 are different from each other. For example, the two reference spots 11A, 11B on the marker 1 can be two black dots, the two auxiliary reference spots 11C, 11D on the marker 1 can be two blue dots, and the light spot 12 on the marker 1 can be a red dot. However, the above colors are described for exemplary purposes only, and are not limited in the present disclosure.

Furthermore, the to-be-analyzed image 36 includes two reference spot images 361A, 361B respectively corresponding to the two reference spots 11A, 11B, and further includes two auxiliary reference spot images 363A, 363B respectively corresponding to the two auxiliary reference spots 11C, 11D.

One (e.g., the reference spot image 361A) of the two reference spot images 361A, 361B is defined as a standard reference spot image, and the image analyzing step S14 further includes the following steps.

An overlap determination step is implemented to determine whether the light spot image 362 overlaps the standard reference spot image.

When the light spot image 362 does not overlap the standard reference spot image, a center of the standard reference spot image and a center of the light spot image 362 are calculated to obtain the X-axis distance and the Y-axis distance. It should be noted that the standard reference spot image in the present embodiment is the reference spot image 361A, but the present disclosure is not limited thereto. In other embodiments of the present disclosure, the reference spot image 361B can be taken as the standard reference spot image.

When the light spot image 362 overlaps the standard reference spot image, another one (e.g., the reference spot image 361B) of the two reference spot images 361A, 361B, the two auxiliary reference spot images 363A, 363B, the true length, an X-axis spacing in the X-axis direction, and a Y-axis spacing in the Y-axis direction, the last two of which are obtained from the two reference spots 11A, 11B, are calculated to obtain a virtual standard reference spot image center coordinate, and the virtual standard reference spot image center coordinate and the center of the light spot image 362 are calculated to obtain the X-axis distance and the Y-axis distance. In the converting step S15, a line connecting centers of the two auxiliary reference spot images 363A, 363B has a length that is defined as the image length.

Specifically, in the overlap determination step, the to-be-analyzed image is processed in the binarization manner through the color of each of the two reference spots on the marker to generate a first processed image, the first processed image is sequentially processed in the erosion and dilation manner and the edge detection manner to recognize an edge of each of the reference spot images of the first processed image, and a quantity of the reference spot images of the first processed image and a reference spot image center coordinate of each of the reference spot images can be obtained by using the findContours( ) function in the OpenCV library. After that, when the quantity of the images of the first processed image corresponding to the reference spots is less than two (i.e., when the first processed image only includes a single image corresponding to the reference spot), the light spot is determined to overlap with one of the two reference spots.

In the same way, the to-be-analyzed image is processed in the binarization manner through the color of each of the two auxiliary reference spots on the marker to generate a second processed image, the second processed image is sequentially processed in the erosion and dilation manner and the edge detection manner, and a quantity of the auxiliary reference spot images of the second processed image and an auxiliary reference spot image center coordinate of each of the reference spot images can be obtained by using the findContours( ) function in the OpenCV library.

Moreover, the to-be-analyzed image is processed in the binarization manner through the color of the light spot on the marker to generate a third processed image, the third processed image is sequentially processed in the erosion and dilation manner and the edge detection manner, and a light spot image center coordinate of the light spot image of the third processed image can be obtained by using the findContours( ) function in the OpenCV library.

As shown in FIG. 10, if the reference spot image 361A is the standard reference spot image that is overlapped with the light spot, after the above processes are implemented, the reference spot image center coordinate of the reference spot image 361B, the two auxiliary reference spot image center coordinates of the two reference spot images 363A, 363B, and the light spot image center coordinate of the light spot image 362 can be obtained and calculated, so that a first vector defined from the reference spot image center coordinate of the reference spot image 361B to the auxiliary reference spot image center coordinate of the reference spot image 363A and a second vector defined from the reference spot image center coordinate of the reference spot image 361B to the auxiliary reference spot image center coordinate of the reference spot image 363B can be calculated to obtain an outer product that is a negative value, which indicates that the light spot image overlaps with the reference spot image 361A.

If the light spot overlaps the reference spot image 361B, after the above processes are implemented, the reference spot image center coordinate of the reference spot image 361A, the two auxiliary reference spot image center coordinates of the two reference spot images 363A, 363B, and the light spot image center coordinate of the light spot image 362 can be obtained and calculated, so that a first vector defined from the reference spot image center coordinate of the reference spot image 361A to the auxiliary reference spot image center coordinate of the reference spot image 363A and a second vector defined from the reference spot image center coordinate of the reference spot image 361A to the auxiliary reference spot image center coordinate of the reference spot image 363B can be calculated to obtain an outer product that is a positive value. The above image processed and the outer product obtained by calculating the first vector and the second vector can be provided for determining whether the light spot image overlaps the standard reference spot image.

In other words, if the light spot image 362 is determined to overlap with one of the two reference spot images, the to-be-analyzed image and the first processed image can be calculated to obtain a reference spot image center coordinate of another one of the two reference spot images that is not overlapped with the light spot image and two auxiliary reference spot image center coordinates of the two auxiliary reference spot images, and a first vector defined from the reference spot image center coordinate to one of the two auxiliary reference spot image center coordinates and a second vector defined from the reference spot image center coordinate to another one of the two auxiliary reference spot image center coordinates can be calculated to obtain an outer product that is a positive value or a negative value and that is provided for determining whether the reference spot image is overlapped with the light spot image is the standard reference spot image.

In the image analyzing step, after the two auxiliary reference spot image center coordinates of the two reference spot images 363A, 363B are obtained, a line connecting centers of the two reference spot images 363A, 363B can be calculated to obtain an image length, and the image length and the true length can be calculated to obtain a scale. After the scale of the image length and the true length is obtained, the scale can be used together with the reference spot image center coordinate of the reference spot image 361B, the X-axis spacing in the X-axis direction, and the Y-axis spacing in the Y-axis direction, the last two of which are obtained from the two reference spots, so as to calculate and obtain the virtual standard reference spot image center coordinate.

In summary, through the two auxiliary reference spots of the present embodiment, even if the light spot overlaps one of the two reference spots, the X-axis offset and the Y-axis offset of the autonomous mobile vehicle can still be obtained by calculation.

In addition, in one embodiment of the present disclosure, the marker of the autonomous mobile vehicle can only include two reference spots; or, the marker can include a reference spot and a reference line; or, the marker can include two reference spots and two auxiliary reference spots; or, the marker can include a reference spot, an auxiliary reference spot, and a reference line. In other embodiments of the present disclosure, the autonomous mobile vehicle can be provided without the marker. In another one of the embodiments of the present disclosure, the autonomous mobile vehicle can include the marker, the light beam device, and the image capture device.

Figure 11:
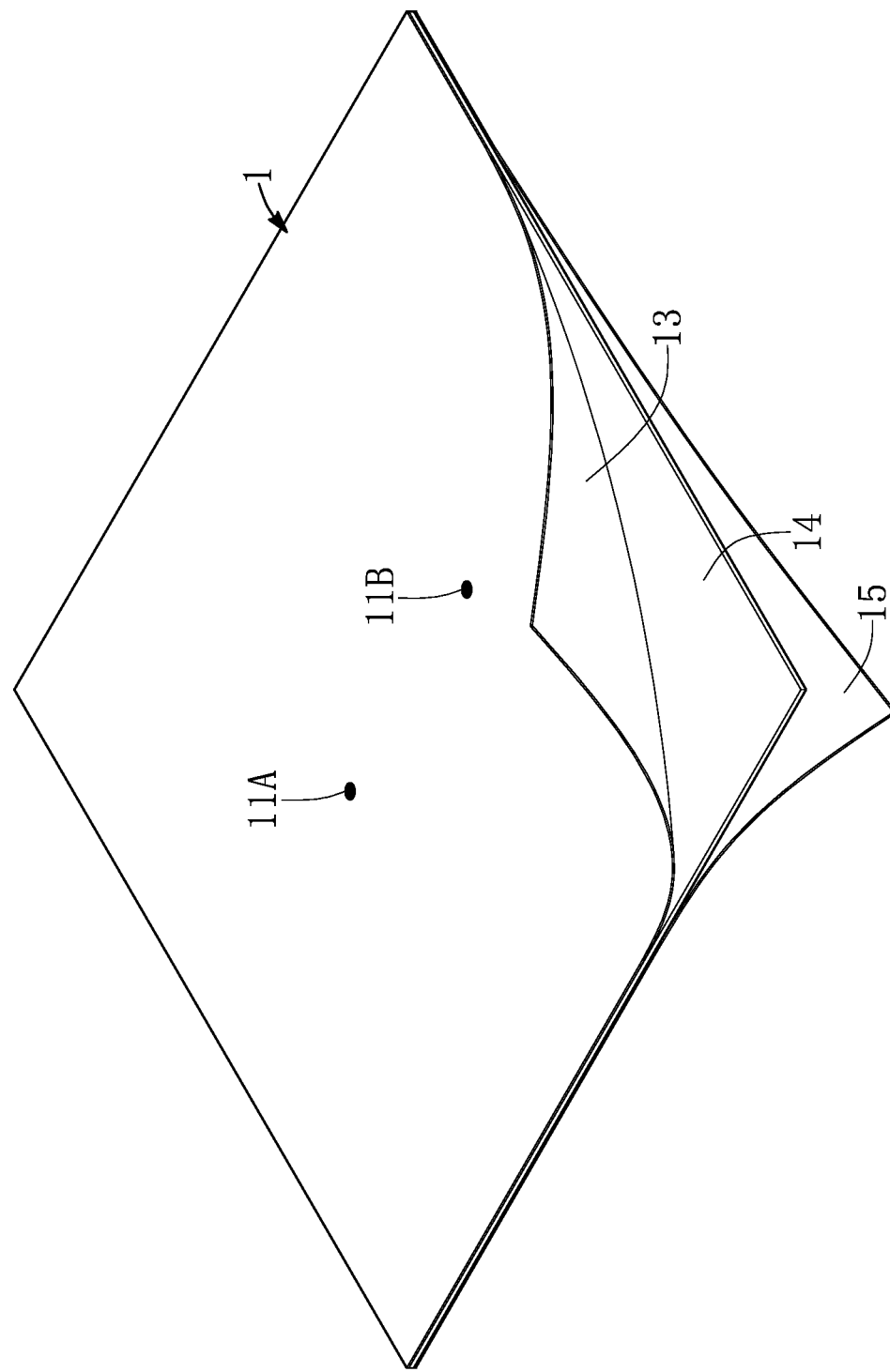
FIG. 11 is a schematic exploded view of a marker of an accuracy measurement kit according to one embodiment of the present disclosure.

As shown in FIG. 11, FIG. 11 is an exploded view of the marker of an accuracy measurement kit according to one embodiment of the present disclosure. The marker 1 can include a main body 13, an adhesive layer 14 disposed on one side of the main body 13, and a releasing film 15 that is disposed on one side of the adhesive layer 14 away from the main body 13, and another side of the main body 13 away from the adhesive layer 14 is provided with the reference pattern (e.g., the two reference spots 11A, 11B). The releasing film 15 is removable to expose the adhesive layer 14, so that the marker 1 can be adhered onto the upper surface of the autonomous mobile vehicle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An accuracy measurement kit for measuring an accuracy of an autonomous mobile vehicle after being moved to a predetermined position, the accuracy measurement kit comprising:

at least one marker including a reference pattern and configured to be disposed on the autonomous mobile vehicle;
at least one light beam device configured to be disposed on a periphery of the predetermined position, wherein the at least one light beam device is configured to emit a light beam onto the at least one marker on the autonomous mobile vehicle located at the predetermined position so as to form a light spot on the at least one marker;
an image capture device configured to be disposed on one of the autonomous mobile vehicle and the periphery of the predetermined position; and
a calculating device electrically coupled to the image capture device, wherein the calculating device is configured to control the image capture device to capture the light spot and the at least one marker on the autonomous mobile vehicle located at the predetermined position for generating a to-be-analyzed image;
wherein the to-be-analyzed image includes a reference pattern image corresponding to the reference pattern of the at least one marker, and a light spot image corresponding to the light spot;
wherein the calculating device is configured to process the to-be-analyzed image so as to obtain an X-axis distance in an X-axis direction and a Y-axis distance in a Y-axis direction of a center of the reference pattern image and a center of the light spot image;
wherein the calculating device is configured to convert the X-axis distance and the Y-axis distance into an X-axis true distance and a Y-axis true distance so as to generate a measurement coordinate according to a reference line of the reference pattern and a true length that is stored therein and that corresponds to the reference line;
wherein the measurement coordinate includes the X-axis true distance and the Y-axis true distance;
wherein the calculating device is configured to average the X-axis true distances and the Y-axis true distances of a plurality of the measurement coordinates so as to obtain a regression center coordinate;
wherein the calculating device is configured to calculate the plurality of the measurement coordinates and the regression center coordinate to obtain an X-axis offset and a Y-axis offset of the autonomous mobile vehicle; and
wherein the regression center coordinate and each of the plurality of the measurement coordinates have a difference in the X-axis direction therebetween and a difference in the Y-axis direction therebetween, the X-axis offset is defined as an average of a plurality of the differences in the X-axis direction, and the Y-axis offset is defined as an average of a plurality of the differences in the Y-axis direction.

2. The accuracy measurement kit according to claim 1, wherein the at least one marker includes a main body, an adhesive layer disposed on one side of the main body, and a releasing film that is disposed on one side of the adhesive layer away from the main body, and another side of the main body away from the adhesive layer is provided with the reference pattern; and wherein the releasing film is removable to expose the adhesive layer, so that the at least one marker is adhered onto an upper surface of the autonomous mobile vehicle through the adhesive layer.

3. The accuracy measurement kit according to claim 1, wherein the reference pattern includes two reference spots and two auxiliary reference spots, the two reference spots on the at least one marker have a same color, and the two auxiliary reference spots on the at least one marker have a same color; and wherein a line connecting centers of the two reference spots and a line connecting centers of the two auxiliary reference spots are of equal lengths.

4. The accuracy measurement kit according to claim 3, wherein the color of each of the two reference spots on the at least one marker is different from the color of each of the two auxiliary reference spots on the at least one marker.

5. The accuracy measurement kit according to claim 4, wherein the color of each of the two reference spots on the at least one marker, the color of each of the two auxiliary reference spots on the at least one marker, and a color of the light spot on the at least one marker are different from each other.

6. The accuracy measurement kit according to claim 1, wherein the reference pattern includes a reference spot and a reference line that do not overlap with each other.

7. The accuracy measurement kit according to claim 1, wherein a quantity of the at least one light beam device of the accuracy measurement kit is two, and the calculating device is configured to control the two light beam devices to respectively form two of the light spots on the at least one marker, the two lights spots not overlapping with each other.

8. An accuracy measurement kit for measuring an accuracy of an autonomous mobile vehicle after being moved to a predetermined position, the accuracy measurement kit comprising:
at least one marker including a reference pattern and configured to be disposed on a periphery of the predetermined position;
at least one light beam device configured to be disposed on the autonomous mobile vehicle, wherein the at least one light beam device is configured to emit a light beam onto the at least one marker on the periphery of the predetermined position so as to form a light spot on the at least one marker;
an image capture device configured to be disposed on one of the autonomous mobile vehicle and the periphery of the predetermined position; and
a calculating device electrically coupled to the image capture device, wherein the calculating device is configured to control the image capture device to capture the light spot and the at least one marker on the periphery of the predetermined position for generating a to-be-analyzed image;
wherein the to-be-analyzed image includes a reference pattern image corresponding to the reference pattern of the at least one marker and a light spot image corresponding to the light spot;
wherein the calculating device is configured to process the to-be-analyzed image so as to obtain an X-axis distance in an X-axis direction and a Y-axis distance in a Y-axis direction of a center of the reference pattern image and a center of the light spot image;
wherein the calculating device is configured to convert the X-axis distance and the Y-axis distance into an X-axis true distance and a Y-axis true distance so as to generate a measurement coordinate according to a reference line of the reference pattern and a true length that is stored therein and that corresponds to the reference line;
wherein the measurement coordinate includes the X-axis true distance and the Y-axis true distance;
wherein the calculating device is configured to average the X-axis true distances and the Y-axis true distances of a plurality of the measurement coordinates so as to obtain a regression center coordinate;

wherein the calculating device is configured to calculate the plurality of the measurement coordinates and the regression center coordinate to obtain an X-axis offset and a Y-axis offset of the autonomous mobile vehicle; and wherein the regression center coordinate and each of the plurality of the measurement coordinates have a difference in the X-axis direction therebetween and a difference in the Y-axis direction therebetween, the X-axis offset is defined as an average of a plurality of the differences in the X-axis direction, and the Y-axis offset is defined as an average of a plurality of the differences in the Y-axis direction.

9. The accuracy measurement kit according to claim 8, wherein the at least one marker includes a main body, an adhesive layer disposed on one side of the main body, and a releasing film that is disposed on one side of the adhesive layer away from the main body, and another side of the main body away from the adhesive layer is provided with the reference pattern; and wherein the releasing film is removable to expose the adhesive layer, so that the at least one marker is adhered onto the periphery of the predetermined position.

10. The accuracy measurement kit according to claim 8, wherein the reference pattern includes two reference spots and two auxiliary reference spots, the two reference spots on the at least one marker have a same color, and the two auxiliary reference spots on the at least one marker have a same color; and wherein a line connecting centers of the two reference spots and a line connecting centers of the two auxiliary reference spots are of equal lengths.

11. The accuracy measurement kit according to claim 10, wherein the color of each of the two reference spots on the at least one marker is different from the color of each of the two auxiliary reference spots on the at least one marker.

12. The accuracy measurement kit according to claim 11, wherein the color of each of the two reference spots on the at least one marker, the color of each of the two auxiliary reference spots on the at least one marker, and a color of the light spot on the at least one marker are different from each other.

13. The accuracy measurement kit according to claim 8, wherein the reference pattern includes a reference spot and a reference line that do not overlap with each other.

14. The accuracy measurement kit according to claim 8, wherein a quantity of the at least one light beam device of the accuracy measurement kit is two, and the calculating device is configured to control the two light beam devices to respectively form two of the light spots on the at least one marker, the two light spots not overlapping with each other.

* * * * *